United States Patent [19] [11] 4,033,783
Brodmann et al. [45] July 5, 1977

[54] METHOD FOR MAKING LIME-SILICA INSULATION FROM PERLITE

[75] Inventors: Franz J. Brodmann; Richard D. Varker, both of Philadelphia, Pa.

[73] Assignee: General Refractories Company, Bala Cynwyd, Pa.

[22] Filed: June 23, 1975

[21] Appl. No.: 589,571

[52] U.S. Cl. .................................. 106/120; 106/85
[51] Int. Cl.² ........................................ C04B 1/00
[58] Field of Search ................. 106/74, 78, 84, 85, 106/120

[56] References Cited

UNITED STATES PATENTS

| | | | |
|---|---|---|---|
| 2,698,256 | 12/1954 | Shea et al. | 106/308 |
| 3,475,189 | 10/1969 | Carter et al. | 106/118 |
| 3,590,111 | 6/1971 | Gebefugi | 106/84 |

*Primary Examiner*—Winston A. Douglas
*Assistant Examiner*—John P. Sheehan
*Attorney, Agent, or Firm*—Everett H. Murray, Jr.; Brian G. Brunsvold; Herbert H. Mintz

[57] ABSTRACT

This invention relates to the manufacture of lime-silica bonded structural materials particularly suitable where structural materials having thermal insulation properties are desired. More specifically, the invention relates to new and improved methods of manufacturing lime-silica bonded structural materials having high modulus of rupture and high compressive strength.

13 Claims, No Drawings

METHOD FOR MAKING LIME-SILICA INSULATION FROM PERLITE

FIELD OF THE INVENTION

In general, the methods of this invention utilize expanded perlite as a source of silica, and comprise mixing activated perlite into an aqueous slurry of lime and fibers, heat-treating the lime-silica mixture to effect gelation, shaping the so-formed gel, completing the lime-silica reaction in an atmosphere of steam generated in an autoclave, and drying the shaped article recovered from the autoclave. It has especially been found that a lime to silica weight ratio of from about 0.7 to about 0.8, particularly about 0.75 achieves an optimum modulus of rupture which may be as much as 30% higher as compared to similar articles known in the prior art and made by processes using diatomaceous earth as the source of silica.

BACKGROUND OF THE INVENTION

It has been known in the art to prepare structural materials for thermal insulation purposes by reacting lime and siliceous material, such as diatomaceous earth, in an atmosphere of saturated steam. It has also been proposed to use a variety of silica sources, including the sodium alumino silicates of volcanic origin, such as expanded perlite. Processes for the manufacture of lime-silica thermal insulating materials are disclosed, for example, in U.S. Pat. No. 2,698,256 issued Dec. 28, 1954 to F. L. Shea, Jr. and H. L. Hsu; and U.S. Pat. No. 3,238,052 issued Mar. 1, 1966 to Mr. Burak and P. McAmespie.

The principal function of the thermal insulation material is to minimize heat losses by reducing the rate of heat flow. In addition to the insulation requirements, an article intended for thermal insulation uses must be heat resistant, non-flammable, and durable. Furthermore, structural materials suitable for thermal insulation purposes, such as pipe, board, and block insulation, must possess sufficiently high modulus of rupture and compressive strength to withstand transportation and fittings. To comply with environmental regulations, the insulation material decomposition products at elevated temperature must be neither corrosive nor noxious.

These requirements are met by the lime-silica insulation products made in accordance with the present invention. It has been particularly found that lime-silica bonded structural articles made in accordance with the method of the present invention have high modulus of rupture as compared to lime-silica insulating material presently available in the industry, whereby the handling performance of the insulating products is substantially improved.

In general, at the present time, natural diatomaceous earth and silica flour are the preferred silica sources for lime-silica bonded insulation products. The lime-silica reaction results in a hydraulic bond formed within an atmosphere of saturated steam. In most lime-silica products, the weight ratio of the lime to silica (hereafter referred to as "the C/S ratio") is maintained in the 0.75 to 1.00 range. The formation of the hydrated calcium silicates proceeds in the following sequence:

1. Calcined lime and silica, whether diatomaceous earth or perlite, react to crystalize tobermorite CSH (II) with a C/S ratio of about 1.75; and
2. The CSH (II) modification reacts with more silica to form CSH (I), reducing the C/S ratio gradually to 0.80.

The morphology of tobermorite crystals generated in lime-silica products made from diatomaceous earth and perlite depends on the autoclaving conditions. With increasing autoclaving time, the needle-like tobermorite phase recrystalizes to platey tobermorite. This inversion results in reduced strength after 8 hours autoclaving time.

A preliminary reaction between the lime and silicous source takes place in the aqueous slurry mix especially at elevated temperatures. Depending on the C/S ratio of the batch, a gel forms in a reasonable time period, e.g., 1 hour. The gelation rate is generally accelerated by adding small quantities of alkali compounds to the formulation. To prevent stress corrosion on steel pipes, the available chlorine content of the lime-silica raw materials must be neutralized, and alkali compounds are most effective in neutralizing acidic impurities. Based on the larger surface area of diatomite, the gel rate is increased so much in the presents of alkali compounds, that the working time of the gel becomes too short resulting in low strength and brittle lime-silica products. Perlite exhibits a much smaller surface area than diatomite, and its gel time is less affected by the alkaline environment.

It can be seen, therefore, that the achievement of desired strength properties of lime-silica insulation products is a problem, and that use of perlite as the silica source is significantly advantageous. Where perlite can be used to form lime-silica structural articles suitable for thermal insulation purposes, and the strength properties of such structural products improved, a substantial commercial improvement can be realized. By the present invention, lime-silica bonded structural articles suitable for thermal insulation purposes having good strength properties and deriving from perlite as the silica source are produced.

In particular, it has been found that lime-silica bonded structural articles made in accordance with the present invention using perlite as the silica source have a modulus of rupture as much as 30% greater than that of lime-silica structural articles presently available made from diatomaceous silica sources.

SUMMARY OF THE INVENTION

In its broadest aspects, this invention relates to a method of making lime-silica bonded structural materials comprising the steps of mixing activated particles of expanded perlite into an aqueous slurry of lime and fibers to form a lime-silica reaction mixture having a C/S ratio greater than about 0.70 and less than about 0.80; heat-treating the reaction mixture to form a gel; forming the gel into a shaped article; curing the shaped article by induration with saturated steam in an autoclave; and drying the steam-treated shaped article. The C/S ratio is important in developing high modulus of rupture and preferably, in the practice of this invention, the C/S ratio is about 0.75.

The expanded perlite used in the process of this invention is expanded and milled particulate perlite. Preferably, the perlite is milled in a blow-milling device and sized by air separation into a product with average particle diameter of from about 1 to about 15 microns. The initial step of the process is the activation of the perlite surface area which may be achieved by treatment of the perlite with an aqueous solution of a sodium-containing activating agent selected from the group consisting of sodium silicate, sodium hydroxide and mixtures thereof, at a temperature of from about 85° C to about 95° C. The surface activation pretreatment of the perlite serves to accelerate the formation of a lime-silica gel.

In accordance with the invention, the activated perlite is mixed into an aqueous slurry of lime and reinforcement fibers to form a lime-silica reaction mixture which is heat-treated to form a gel. Preferably, the heat treatment of the reaction mixture is effected at a temperature of up to about 95° C for a period of time up to about an hour to complete the gel formation.

In keeping with the concept of the invention, the lime-silica gel may be shaped by any suitable process to form a lime-silica shaped article. Useful shaping processes include pancasting, filterpressing, or board laminating. Articles other than board are preferably made by the filterpress shaping process, while fire-resistant structural insulation boards are manufactured on laminating board machines.

According to the invention, after shaping the lime-silica gel, the resulting shaped article is cured by steam autoclaving. Preferably, steam pressures of from about 150 to about 200 psi for a period of from about 4 to about 6 hours are used. The steam treatment completes the induration of the lime and the perlite to form a lime-silica bonded structural shape.

In accordance with the practice of this invention, the cured lime-silica shaped article is dried at a temperature sufficient to remove excess moisture up to about 200° C. Preferably, the cured material is dried at about 200° C for a period of from about 6 to about 8 hours.

The present invention consists of the processes, compositions, articles, combinations and improvements set forth herein and in the appended claims. It is to be understood that both the foregoing general description and the following detailed descriptions are exemplary and explanatory, but are not restrictive of the invention.

DETAILED DESCRIPTION OF THE PREFERRED EMBODIMENTS

In accordance with the present invention, and as embodied herein, there is provided a method of making lime-silica bonded structural materials having a superior combination or properties, including strength characteristics, rendering them suitable for use as thermal insulation materials, and using expanded perlite as a source of silica. As used herein, the term "perlite" designates all expansible volcanic glasses, composed essentially of aluminum silicates in varying degrees of hydration and combined with small amounts of alkalis. The term "perlite" includes naturally occurring volvanic glasses, such as obsidian, vitrophyre, pitchstone, tachylite, pumice, and vitric or glossy tuff, all of which expand on heat treatment at a temperature of from about 850° to about 1200° C depending on the composition. The various perlites contain from about 70 to about 75% $SiO_2$, from about 12 to 15% $Al_2O_3$, from about 0.5 to about 6% bound water, from about 2 to about 5% $Na_2O$, from about 2 to 6% $K_2O$ and minor amounts of such other constituents as $Fe_2O_3$, $TiO_2$, CaO and MgO.

The perlite is initially expanded by heat and may be milled in a blow-milling device to form particulate perlite in the particle size range desired. The perlite particles may be sized by air separation into a product preferably having an average particle diameter from about 1 to about 15 microns.

In accordance with the invention as embodied herein, the expanded and milled perlite is surface activated to accelerate the gel formation by a chemical etching treatment with an aqueous solution of sodium silicate, sodium hydroxide or mixtures thereof. The sodium activating agent may comprise about 0.1% to about 3.0%, and preferably about 1.0%, by weight of the solution. Treatment with the aqueous solution of sodium-containing activating agent is effected at temperatures of from about 85° to 95° C, preferably about 85° C., for a period of from about 5 to about 30 minutes, preferably about 10 minutes. It is preferred that the aqueous mixture of perlite and activating agent be agitated during treatment.

In accordance with the invention and as embodied herein, the activated perlite is mixed into an aqueous slurry of lime and reinforcement fibers to form a lime-silica reaction mixture. Commercially available sources of lime may be used in the practice of the invention. For example, such sources of lime include calcined lime (CaO), slaked lime ($Ca(OH)_2$), and slaked dolomitic lime ($Mg(OH)_2\,Ca(OH)_2$). It has been found that gel time is lower when slaked limes, including slaked dolomitic lime, and these are preferred.

Reinforcement of the shaped articles produced by the practice of the present invention is achieved by the inclusion of suitable fibrous materials in an aqueous slurry with the lime. The particular fibrous material selected is not critical. Reinforcement fibers which may be used in accordance with the invention include both organic and mineral fibrous materials. Exemplary of organic materials which may be used in the form of fibers include vegetable materials such as hemp and jute; synthetic organic fibers; and other organic materials such as shredded paper, rags, and the like. Preferably, the reinforcing fibers are of the mineral type. Mineral fibers include fibers made of mineral wool, glass fibers and inorganic fibers, such as inorganic fibers derived from synthetic fibers. A particularly preferred reinforcement fiber for use where flame retardance is especially desired is asbestos fiber. In general, the mineral fibers are particularly desirable where the insulation materials produced according to the invention are intended for use under temperature conditions at which organic fibers would decompose.

It has been found that inclusion of the reinforcement fibers with the lime in an aqueous slurry is desirable from both the processing and ultimate product standpoints. The proportion of fibers may be from about 1.0% to about 10.0% based on solid content, with about 2.0% to about 7.0% being a suitable amount in most cases. Preferably, about 4% of fibers is used.

Prior to the addition of the activated perlite to the aqueous slurry of a lime and fibers, this aqueous lime slurry is preferably agitated for a period of time, e.g., about 10 minutes. The activated perlite is added to the pre-mixed lime slurry. Preferably, the activated perlite is added to the lime slurry without separation from the aqueous solution of activating agent with which the perlite was reacted.

The exact proportions of lime and perlite per se are not critical in the practice of the invention. Rather it has been found that the C/S ratio is a parameter which must be closely controlled to achieve the desired strength characteristics of the final product. At C/S ratios lower than about 0.70 or higher than about 0.80, the modulus of rupture (hereafter "MOR") decreases very rapidly. However, if the C/S ratio is above about 0.70 but below 0.80, an MOR of from about 55 psi to almost 100 psi can be achieved. Particularly, it has been found that at a C/S ratio of about 0.75, the optimum MOR strength is achieved, with the MOR approaching 100 psi, a significantly higher value than is presently available in the industry even using diatomaceous silica sources. The aqueous lime slurry and aqueous slurry containing activated perlite are therefore mixed in suitable proportions to adjust the C/S ratio to greater than about 0.70 and less than about 0.80, preferably about 0.75.

In accordance with the invention as embodied herein, the aqueous lime-silica reaction mixture is heated to form a gel. Heat treatment is preferably effected at a temperature of from about 80° to about 95° C, and especially at about 91° C. It has been found that the perlite mixtures normally have longer gel times than mixtures using diatomaceous silica sources at the same temperature. However, raising the heat treatment temperature to about 91° C accelerates the time of gel formation of perlite mixtures to a point close to that of diatomaceous mixtures at lower useful temperatures. The aqueous reaction mixture is preferably agitated during heat treatment. Heat treatment is continued until a lime-silica gel which can be shaped is formed.

In accordance with this invention, the lime-silica bonded structural materials are made either by direct synthesis from lime and perlite or by means of cement-silicate-silica-reactions. In both processes, the aqueous lime-silica gel is molded to shape, indurated in an autoclave, and dried in an oven. Molding methods in general use may be adapted for application to the present invention. Included among suitable molding methods are simple pan-casting, modified pan-casting, filter-press molding, and laminating on board machines. Depending upon the method selected, the aqueous lime-silica reaction mixture may first be heat-treated to form a lime-silica gel and then subsequently shaped in the molding apparatus or the aqueous reaction mixture may be introduced in the molding apparatus and be concurrently treated to form a gel and shaped.

In the simple pan-casting shaping method, an aqueous slurry containing lime, the activated perlite, and reinforcement fibers are poured into a mold, which is placed in an autoclave. The disadvantage of the simple pan-casting method resides in the large number of molds necessary to run continuous production.

The modified pan-casting process overcomes the difficulty in continuous production present in the simple pan-casting method. In the modified pan-casting process, the raw materials are mixed with a controlled quantity of water to form a slurry which is heated by steam injection. The heated slurry is transferred to hot water-jacketed molds in which it sets to a firm gel. The self-supporting shapes are removed from the mold and autoclaved, following which they are dried until the uncombined water is released.

In accordance with the invention, it is preferred that the aqueous slurry be shaped by the filterpress molding process. Filterpress molding requires a gelatinous mixture to produce lightweight material. A pre-gelled slurry formed as described above is metered into a mold having its major surfaces fitted with a fine filtration mesh. The mold is closed under pressure to remove the water and form the shape. The so-formed shape is ejected from the mold and immediately autoclaved to complete curing. The cured shaped article is subsequently dried.

Structural insulation boards may be manufactured on laminating board machines which are equipped with a mixing chest, a transfer vat, an endless felt blanket, and a metal making roll. The aqueous slurry of lime, perlite and fibers is prepared in the mixing chest. The vat contains a rotating cylinder covered with fine filtration mesh which transfers a film of partially dewatered slurry to the moving felt blanket. Vacuum boxes remove more water from the slurry and then deposit a continuous film of solids on the rotating making roll. When the required thickness has been reached, a cut is made along the length of the roll, and the green board is removed. In the manufacture of boards, asbestos fibers and hydrated calcium silicate are used to achieve fire-resistant structural insulation boards.

In accordance with the present invention, by whatever shaping method it is made, the shaped product is cured by induration in an autoclave. The autoclave is preferably operated at steam pressures of from about 150 to 200 psi, and the shaped product subjected to induration in the autoclave preferably for a period of from about 4 to 6 hours.

Following the autoclaving operation, the cured shaped product is dried to remove the excess moisture. The drying step may be effected at a temperature sufficient to remove the excess moisture up to about 200° C, and preferably at about 200° C, with a drying cycle of from about 6 to about 8 hours being suitable.

In general, commercial insulation products can be classified into three groups: low, intermediate and high temperature insulation. The density, strength and thermal conductivity requirements of the insulation products increase with temperature. Low temperature heat insulation products have a temperature application range of from about room temperature to about 1200° F, while high temperature heat insulation products are generally intended for use at temperatures above about 1800° F.

By practice of the present invention, intermediate temperature insulation products are achieved. The products obtained through the present process have a density in the range of about 10 to about 20 lbs/cu.ft. and are intended for use in the temperature range of from about 1200° F to about 1800° F. In addition, the method of the present invention can be employed for making structural lime-silica boards in the density range up to about 60 lbs/cu.ft. having some thermal insulation properties.

The following examples serve to illustrate the practice of the invention, and in conjunction with the general and more detailed description of preferred embodiments above, help to explain the principles of the invention. However, the following examples are illustrative only and are not intended to limit the scope of the invention.

EXAMPLE 1

This example illustrates the practice of the process of the present invention using a filterpress molding method. Particles of expanded perlite are mixed with an aqueous solution of sodium silicate in a 1:10 solid-liquid ratio. The mixture is heated to 190° F. In a separate tank, quicklime is slaked with 9 parts water for 10 minutes and mixed with wool fibers to form a slurry. The lime-wool fiber slurry is added to the aqueous mixture of perlite and sodium silicate. At a temperature of 200° F, the slurry containing expanded activated perlite particles, slaked lime, and wool fibers is fast agitated for 10 minutes followed by 35 minutes of mild agitation (3-5 rpm) to effect gelation. After 45 minutes, the slurry is quenched with cold water amounting to about 15% of the total water content. The pre-gelled slurry is metered into a filterpress mold. The mold is closed under pressure sufficient to remove the water and form the shape. The shape is then ejected from the mold and is immediately indurated in an autoclave at 150 psi steam pressure for 3 hours. The cured shaped article is removed from the autoclave and dried in a drying chamber at 200° C for 6 to 8 hours. The product is useful as an intermediate temperature insulation material.

EXAMPLE 2

The process of Example 1 was repeated at different C/S ratios over the range 0.6 to 1.1 and the MOR strengths measured. The perlite (PE) used was expanded and blow-milled to yield particles with average diameter of from about 1 to about 15 microns. The raw material formulation for C/S 0.75 in percentage is as follows:

| | | |
|---|---|---|
| Perlite | — | 57.42% |
| Quick | — | 31.44% |
| Wood | — | 4.15% |
| Solid Sodium Silicate | — | 6.99% |
| | | 100.00% |

The test samples were 1×1×5 inches on 3 inch span. The bulk density of the samples was maintained constant at 13.5 lbs/cu.ft., and gel time was kept constant at 1 hour.

Unexpectedly, it was found that at a C/S ratio of about 0.70, the MOR strength begins increasing rapidly with greater C/S ratios to a maximum value close to 100 psi at a C/S ratio of 0.75. The MOR strength then declines with increasing C/S ratio until at a C/S ratio of almost 0.80, the MOR strength dips to its value at a C/S ratio of about 0.70. At C/S ratios between about 0.70 and 0.80, the MOR strength is above 50 psi. Such MOR values compare favorably with those attained using diatomaceous silica sources, and at the optimum C/S ratio of about 0.75, and MOR strength exceeds that of commercially available lime-silica bonded structural insulation shapes made from diatomaceous silica sources.

The present invention therefore provides lime-silica bonded structural insulation shapes made using perlite of comparable or better MOR strength than similar shapes made from diatomite. Even though more perlite is used by comparison to diatomite in the process if run under the same conditions, the cost of the perlite formulation is lower on the finished product basis due to the lighter density and lower shipping costs of perlite.

The present invention provides a commercially significant process in affording a means of using lower cost and readily available perlite to make structural products which meet the requirements for excellent thermal insulation and which have strength properties comparable or, for optimized formulations, superior to conventional products intended for similar use.

The invention in its broader aspects is not limited to the specific embodiments described. Certain modifications will be obvious to those skilled in the art and can be without departing from the scope and spirit of the invention and without sacrificing the principal advantages of the invention.

What is claimed is:

1. A method of making lime-silica bonded structural materials suitable for use for insulation purposes comprising the steps of:
    a. mixing particles of expanded perlite surface activated to accelerate gel formation with an aqueous slurry comprising lime and reinforcement fibers to form an aqueous lime-silica reaction mixture, the relative proportion by weight of perlite and lime being adjusted to provide a C/S ratio greater than about 0.70 and less than about 0.80;
    b. heat treating the aqueous lime-silica reaction mixture to form a lime-silica gel;
    c. shaping the lime-silica gel to form a lime-silica shaped article;
    d. curing the lime-silica shaped article by treating the article in steam; and
    e. drying the cured lime-silica shaped article to remove excess moisture.

2. A method according to claim 1 in which the C/S ratio of the lime silica mixture in step (a) is adjusted to about 0.75.

3. A method according to claim 1 in which the perlite particles have an average diameter of from about 1 to about 15 microns.

4. A method according to claim 1 in which the surface activated perlite is formed by reacting particles of expanded perlite with an aqueous solution of sodium silicate at a temperature of from about 85° C to about 95° C.

5. A method according to claim 1 in which the aqueous lime-silica reaction mixture is heat treated in step (b) with agitation at a temperature of from about 80° to about 95° C.

6. A method according to claim 1 in which the lime is freshly slaked lime.

7. A method according to claim in which the lime-silica gel is shaped in step (c) by filterpressing.

8. A method according to claim 1 in which the lime-silica shaped article is cured in step (d) by treating in steam at a steam pressure of from about 150 to about 200 psi for a period of from about 4 to about 6 hours.

9. A method according to claim 1 in which the cured lime-silica shaped article is dried in step (e) at a temperature sufficient to remove excess moisture, but not higher than about 200° C.

10. A method of making lime-silica bonded structural materials suitable for use for insulation purposes comprising the steps of:
    a. reacting expanded perlite particles having an average diameter of from about 1 to about 15 microns with an aqueous solution of sodium silicate at a temperature of from about 85° C to about 95° C to form surface activated particles of expanded perlite;
    b. mixing the surface activated particles of expanded perlite with an aqueous slurry comprising lime and reinforcement fibers to form an aqueous lime-silica reaction mixture, the relative proportion by weight of perlite and lime being adjusted to provide a C/S ratio greater than about 0.70 and less than about 0.80;
    c. heat-treating the aqueous lime-silica reaction mixture with agitation at a temperature of from about 80° C to about 95° C for a time sufficient to form a lime-silica gel;

d. shaping the lime-silica gel in a filterpress mold to form a lime-silica shaped article;

e. curing the lime-silica shaped article by autoclaving at a steam pressure of from about 150 to about 200 psi for a period of from about 4 to about 6 hours to form a cured lime-silica shaped article; and f. drying the cured lime-silica shaped article at a temperature sufficient to remove excess moisture but not higher than about 200° C.

11. A method according to claim 10 in which the C/S ratio of the lime-silica mixture of step (b) is adjusted to about 0.75.

12. A method according to claim 10 in which the lime is selected from the group consisting of calcined lime, slaked lime and slaked dolomitic lime.

13. A method according to claim 12 in which the lime is freshly slaked lime.

* * * * *